US012658571B2

(12) United States Patent
Singh et al.

(10) Patent No.: US 12,658,571 B2
(45) Date of Patent: Jun. 16, 2026

(54) BEAM SHAPING IN REFLECTIVE METASURFACE UTILIZING MECHANICAL LINEAR ACTUATORS

(71) Applicant: Dell Products L.P., Round Rock, TX (US)

(72) Inventors: Tejinder Singh, Kanata (CA); Navjot Kaur Khaira, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 19 days.

(21) Appl. No.: 18/598,392

(22) Filed: Mar. 7, 2024

(65) Prior Publication Data

US 2025/0286275 A1 Sep. 11, 2025

(51) Int. Cl.
*H01Q 3/01* (2006.01)

(52) U.S. Cl.
CPC .................................... *H01Q 3/01* (2013.01)

(58) Field of Classification Search
CPC ........... H04B 7/04013; H01Q 15/0086; H01Q 15/148; H01Q 15/0066; H01Q 3/16; H01Q 3/46; H01Q 15/14; H01Q 15/002; H01Q 3/12; H01Q 3/01
See application file for complete search history.

(56) References Cited

U.S. PATENT DOCUMENTS

| | | | | |
|---|---|---|---|---|
| 9,640,867 | B2 * | 5/2017 | Behdad | H01Q 15/148 |
| 10,938,115 | B2 | 3/2021 | Urzhumov | |
| 11,990,671 | B2 | 5/2024 | Bailey et al. | |
| 2003/0043071 | A1 * | 3/2003 | Lilly | H01Q 3/2605 342/368 |

OTHER PUBLICATIONS

NPL—Continuously Tunable mm-Wave High Impedance Surface—Marina Mavridou, Konstantinos Konstantinidis et al., and Alexandros P. Feresidis—Senior Member, IEEE (Year: 2016) (Year: 2016).*

(Continued)

*Primary Examiner* — Dameon E Levi
*Assistant Examiner* — Gurbir Singh
(74) *Attorney, Agent, or Firm* — Amin, Turocy & Watson, LLP

(57) ABSTRACT

The technology described herein is directed towards a design and implementation of a reconfigurable surface that reflects an impinging electromagnetic signal, with a phase profile determined by the curvature of a flexible metallic ground plane beneath metallic resonating elements of the reconfigurable surface. The amount of curvature forms different gaps between portions of the flexible ground plane and the respective metallic resonating elements above those portions, and thus determines the shape of the reflected beam. In one implementation, four individually controllable linear actuators are mechanically coupled to the corners of the ground plane of a metasurface (panel). These actuators enable a curvature phase profile, by determining the amount of curvature of a flexible, metallic ground, which allows a reflected beam to be shaped. The design is low cost, yet operates on millimeter wavelength beams, which are useable in numerous wireless communication scenarios.

20 Claims, 16 Drawing Sheets

(56) References Cited

OTHER PUBLICATIONS

NPL—12, Dec. 2016—Dynamically Reconfigurable High Impedance and Frequency Selective Metasurfaces Using Piezoelectric Actuators—Marina Mavridou and Alexandros P. Feresidis,—IEEE Transactions on Antennas and Propagation (Year: 2016) (Year: 2016).*
NPL—Continuously Tunable mm-Wave High Impedance Surface—Marina Mavridou, Konstantinos Konstantinidis et al., and Alexandros P. Feresidis—Senior Member, IEEE (Year: 2016).*
NPL—12, Dec. 2016—Dynamically Reconfigurable High Impedance and Frequency Selective Metasurfaces Using Piezoelectric Actuators—Marina Mavridou and Alexandros P. Feresidis,—IEEE Transactions on Antennas and Propagation (Year: 2016).*
NPL—Mar. 6, 2017—Wirelessly Automated Reconfigurable Antenna With Directional Selectivity—Youssef Tawk1 , Joseph Costantine2 , Fadi Makhlouf1, Maria Nassif1 , Leonel Geagea1 , And Christos G. Christodoulou3 , (Fellow, IEEE) (Year: 2017).*
mouser.com, "MA4FCP200," https://www.mouser.com/ProductDetail/MACOM/MA4FCP200?qs=sGAEpiMZZMvzlsPcC61n6mKOVZ%2FmvpYc%252BB8AMtXWKnE%3D, Retrieved from the Internet Feb. 6, 2024.
mouser.com, "M74HC595YRM13TR," https://www.mouser.com/ProductDetail/STMicroelectronics/M74HC595YRM13TR?qs=WHIX%252B%252B9%2FRwBw%252B7pGf3ngqg%3D%3D, Retrieved from the Internet Feb. 6, 2024.
mouser.com, "ABX00080," https://www.mouser.com/ProductDetail/Arduino/ABX00080?qs=ulEaXIWI0c9tbG%2FHj5EzRA%3D%3D, Retrieved from the Internet Feb. 6, 2024.
mouser.com, "A000079," https://www.mouser.com/ProductDetail/Arduino/A000079?qs=gMoqXxk%2F%2F5arlTJCT4KaEg%3D%3D, Retrieved from the Internet Feb. 6, 2024.
mouser.com, "195200-237," https://www.mouser.com/ProductDetail/Ledex/195200-237?qs=byeeYqUlh0OpzXo5InRdYQ%3D%3D, Retrieved from the Internet Feb. 6, 2024.
Ericcson, "5G Advanced: Evolution towards 6G," BNEW-22:024836 Uen, Jun. 2023.
Nokia Bell Labs, "Communications in the 6G Era," Sep. 9, 2020.
L. Subrt and P. Pechac, "Controlling Propagation Environments Using Intelligent Walls," in 6th European Conference on Antennas and Propagation (EUCAP), 2012.
N. Kaina, M. Dupre, G. Lerosey, and M. Fink, "Shaping complex microwave fields in reverberating media with binary tunable metasurfaces," Scientific Reports, vol. 4, pp. 1-7, Aug. 2017.
L. Dai, B. Wang, M. Wang, X. Yang, J. Tan, S. Bi, S. Xu, F. Yang, Z. Chen, M. Di Renzo, C.-B. Chae, and L. Hanzo, "Reconfigurable Intelligent Surface-Based Wireless Communications: Antenna Design, Prototyping, and Experimental Results," in IEEE Access, vol. 8, pp. 45913-45923, 2020.
C. Huang, C. Zhang, J. Yang, et al., "Reconfigurable metasurface for multifunctional control of electromagnetic waves", in Advanced Optical Materials, vol. 5, No. 22, 2017.
E. Baladi, M. Y. Xu, N. Faria, J. Nicholls, and S. V. Hum, "Dual-Band Circularly Polarized Fully Reconfigurable Reflectarray Antenna for Satellite Applications in the Ku-Band", IEEE Transactions on Antennas and Propagation, 1-1. doi:10.1109/tap.2021.3090577, 2021.
PI-USA.US, "P-088 Round PICMAR Stack Multilayer Piezo Actuator," https://www.pi-usa.us/en/products/piezo-actuators-stacks-benders-tubes/p-088-round-picma-stack-multilayer-piezo-actuator-100821, Retrieved from the Internet Feb. 6, 2024.
PI-USA.US, "P-216 PICA Power Piezo Actuators," https://www.pi-usa.us/en/products/piezo-actuators-stacks-benders-tubes/p-216-pica-power-piezo-actuator-101555, Retrieved from the Internet Feb. 6, 2024.
L. Schmitt, X. Liu, A. Czylwik et al., "Design and Fabrication of MEMS Reflectors for THz Reflect-Arrays," Fourth International Workshop on Mobile Terahertz Systems (IWMTS), pp. 1-5, Germany 2021.
H. Kim, S. Oh, S. Band et al., "Independently Polarization Manipulable Liquid-Crystal-Based Reflective Metasurface for 5G Reflectarray and Reconfigurable Intelligent Surface," IEEE Transactions on Antennas and Propagation, Jun. 2023.
Singh, et al. "Beam Steering and Beam Shaping in Reflective Metasurface Utilizing Linear Motion and Mechanical Actuators" U.S. Appl. No. 18/598,416, filed Mar. 7, 2024, 65 pages.
Singh, et al. "Beam Shaping in Reflective Metasurface Utilizing Mechanical Linear Actuators With Temperature Compensation" U.S. Appl. No. 18/798,193, filed Aug. 8, 2024, 47 pages.
Non-Final Office Action received for U.S. Appl. No. 18/598,416 dated Aug. 20, 2025, 33 pages.
Final Office Action received for U.S. Appl. No. 18/598,416 dated Feb. 4, 2026, 26 pages.
Notice of Allowance received for U.S. Appl. No. 18/798,193 dated Dec. 16, 2025, 10 pages.
Notice of Allowance for U.S. Appl. No. 18/598,416 dated Apr. 22, 2026, 61 pages.

* cited by examiner

BEAM SHAPING IN REFLECTIVE METASURFACE UTILIZING MECHANICAL LINEAR ACTUATORS

BACKGROUND

Reconfigurable intelligent surfaces, sometimes referred to as metasurfaces, redirect (e.g., reflect or refract) incoming electromagnetic beams in a fixed direction, by modifying the resultant beams in terms of phase, amplitude, and polarization. As such, reconfigurable surfaces are being investigated for use in the millimeter wave (mmWave) spectrum, where reflected beams can avoid obstacles that otherwise block a signal between a transmitter (e.g., a base station) and a receiver (e.g., a user equipment).

Some current electronically tunable designs depend on PIN diodes and/or varactors acting as switches between metallic patterns. Commonly available PIN diodes and varactors have a number of problems, however, including low maximum operating frequencies and other frequency-dependent characteristics such as narrow bandwidth, which limits their use at mm Wave frequencies. PIN diodes and varactors offer high losses and parasitic effects that are particularly severe at mmWave frequencies, which is not desirable for high frequency performance. Further, there is only limited reconfigurability achieved using PIN diodes and varactors at mmWave operational range; for example, PIN diodes offer only either ON or OFF states, whereby only two reconfigurable states of phase are possible from using a single PIN diode in a metasurface. Still further, on-chip components like varactors/PIN diodes need to be soldered in each reconfigurable intelligent surface element. For low frequencies, when the individual cell size is large, this approach can still be employed, however at mm Wave frequencies (30-300 GHz), soldering becomes a challenge with the shrinking cell size, making the device performance highly sensitive to the type and quality of the assembly and packaging process.

Current metasurfaces based on PIN diodes and varactors are also expensive. For example, in one metasurface of unit cells, for bias control each unit cell needs eight varactors and one operational amplifier (op-amp) integrated circuit to provide the desired voltage gain to actuate the varactors. Hence, for an 8×8 array, 512 varactors and 64 op-amps are required. For larger RIS arrays, the complexity of bias control will scale multifold.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
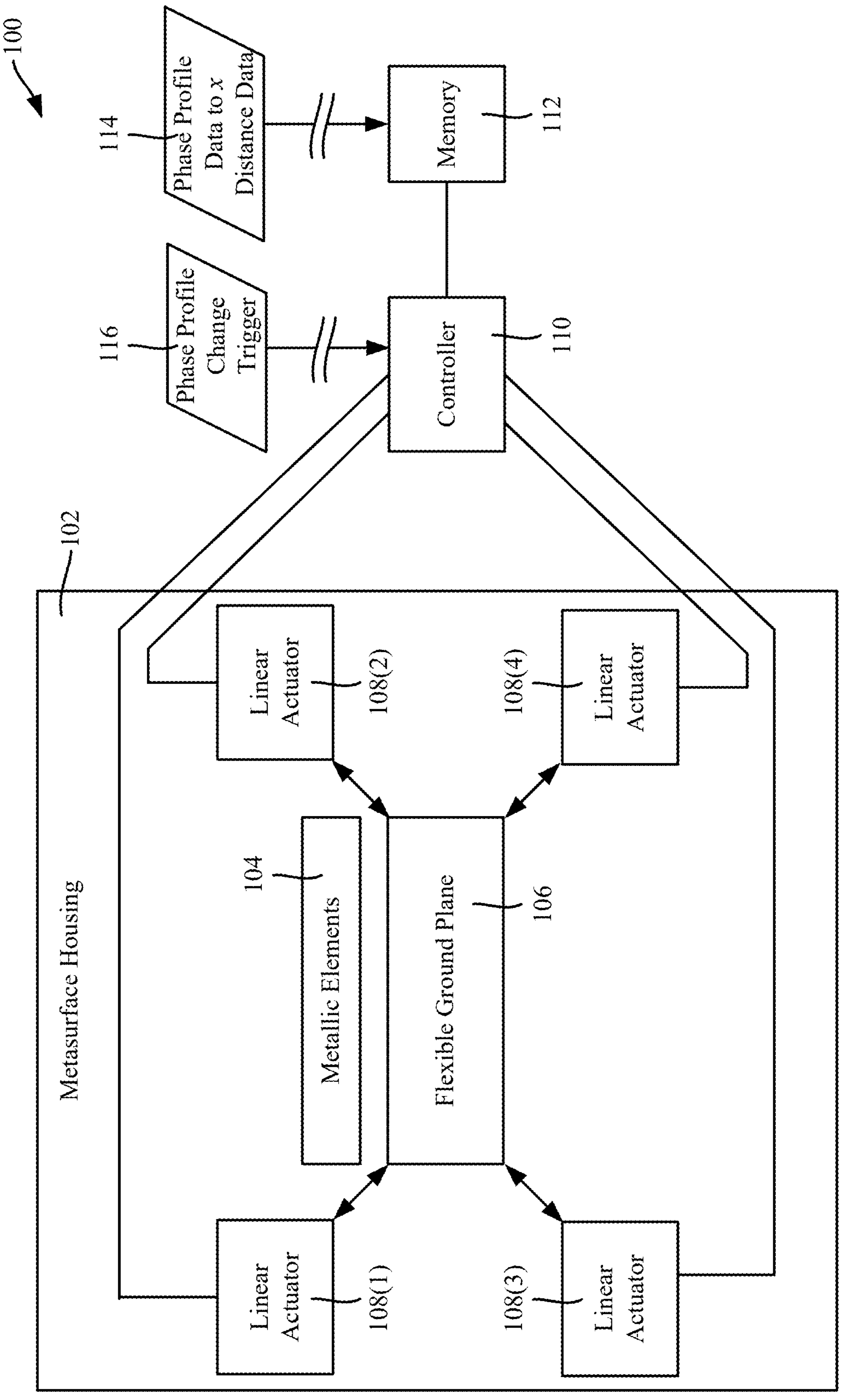
FIG. 1 is an example conceptual block diagram showing a reconfigurable surface (metasurface) in which linear motion actuators curve a ground plane to achieve analog and dynamic beam shaping of a reflected electromagnetic signal, in accordance with various example embodiments and implementations of the subject disclosure.

The technology described herein is generally directed towards low-cost beam shaping using reflective metasurfaces (reconfigurable surfaces) that are coupled to mechanical linear actuators. The technology described herein is based on advanced metasurfaces with analog style beam shaping capabilities, which dynamically and accurately manipulate reflected signal directions.

In one implementation, four individually controllable linear actuators are mechanically coupled to the corners of a ground plane of a metasurface (panel). These actuators enable a curvature phase profile, by determining the curvature of a flexible, metallic ground, which allows a reflected beam to be shaped.

The technology described herein is based on an air cavity formed between a periodic resonating metallic surface on a dielectric substrate and a floating ground plane made using a flexible thin metal sheet. By employing linear motion actuators that support and provide linear force to the flexible thin metal sheet, e.g., at each of its four corners, the amount of curvature of the metal sheet is adjustable, which can significantly alter the reflection phase response, including at operational frequencies around 28 GHz. This alteration is driven by the actuators' precision movement, which compresses the flexible sheet towards inside of the cavity, whereby the curvature can be adjusted in analog style. The actuators can similarly be controlled in the opposite direction to decompress the flexible sheet. The amount of curvature of the flexible sheet determines the phase reflection, which is dependent on the variable distances (e.g., heights if positioned vertically) of the air gaps. Leveraging the linear motion actuators and providing bias to the actuators offers a gradient phase profile to the entire metasurface array, facilitating precision-tuning of the reflection characteristics, which results in beam shaping.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and reconfigurable intelligent surfaces in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual block depiction of an example system 100 including a metasurface housing 102, which, via metallic elements 104 and a flexible ground plane 106, reflects an impinging (incoming) signal, (an electromagnetic (EM)/radio frequency (RF) wave), such as near or within the millimeter wavelength, e.g., above 25 gigahertz.

In one implementation, four linear actuators 108(1)-108(4) are mechanically coupled (e.g., at forty-five degrees) to force the flexible ground plane 106 a desired distance towards a center point of the metallic elements 104, or pull them back to create less (or no) curvature in the ground plane. As will be understood, inward or outward movement of the actuators curves the flexible ground plane 106 to a desired amount, resulting in differences in distances (gaps) between individual portions of the ground plane and corresponding individual resonating metallic patterns of the metallic elements 104.

A controller 110 drives the linear actuators 108(1)-108(4) a desired distance (e.g., in what can be considered a +x or −x direction from the perspective of the actuators), to determine the amount of curvature of the flexible ground plane 106. Electrical driving circuits or the like (not explicitly shown) can be used as needed to provide sufficient power to the linear actuators 108(1)-108(4), e.g., for a controller that outputs only low voltage/low current signals that thus indirectly drive the linear actuators 108(1)-108(4).

The controller 110 can be coupled to a memory 112 that contains the phase profile data (e.g., including the actuator distances) needed to curve the flexible ground plane 106 the desired amount that results in a desired phase profile for the reflected beam. Multiple sets of phase profile data/actuator distances may be written or downloaded to (e.g., block 114) and/or maintained in the memory 112 as needed, and a suitable phase profile trigger (e.g., block 116) can be used to instruct the controller 110 as to which set of phase profile data to use to correspondingly drive the linear actuators 108(1)-108(4) to beamform/shape the reflected beam. The reflected beam thus may be dynamically reshaped in a relatively fast manner, based only on how fast the actuators can flex the flexible ground plane 106 to the specified phase profile data's amount of curvature.

Figure 2:
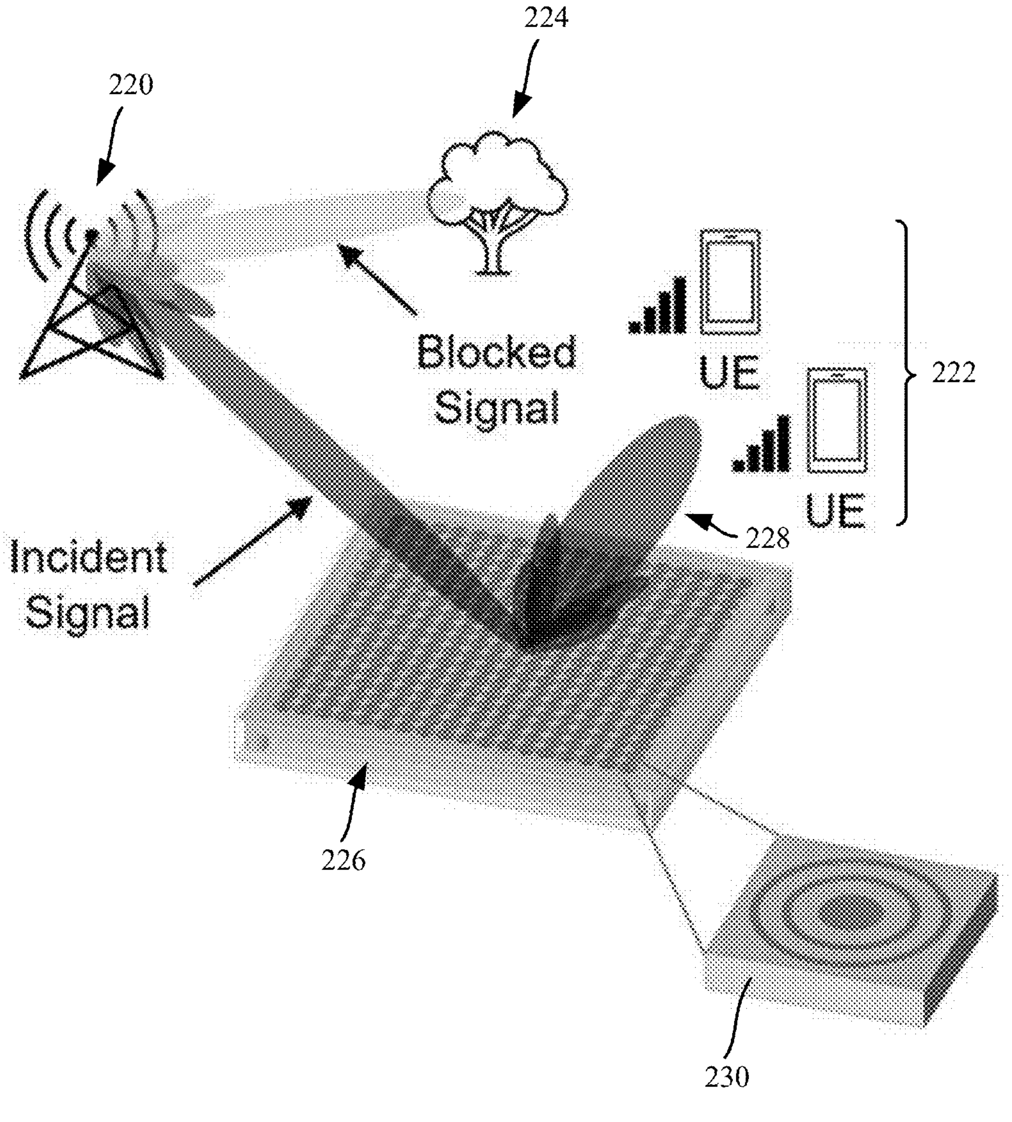
FIG. 2 is an example representation of one use-case scenario in which a reconfigurable surface shapes a broader, lower-gain beam (relative to FIG. 3) to provide coverage to nearby user equipment devices, in accordance with various example embodiments and implementations of the subject disclosure.
Figure 3:
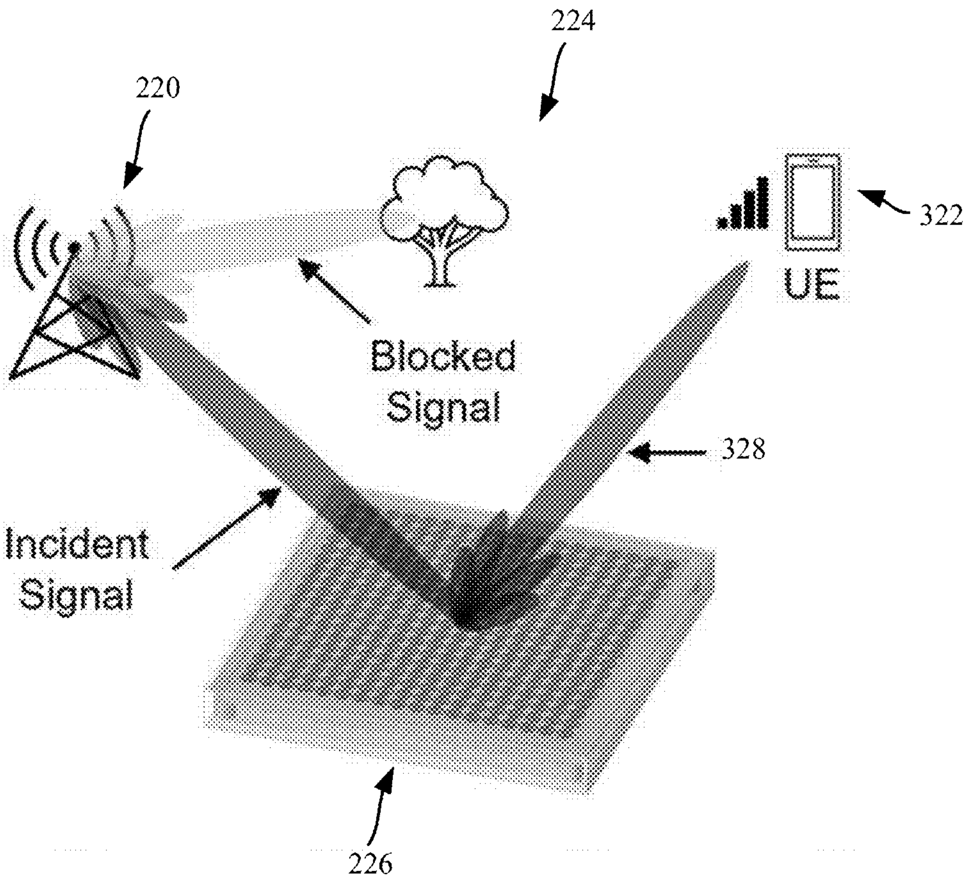
FIG. 3 is an example representation of another use-case scenario in which the reconfigurable surface shapes a narrower, higher-gain beam (relative to FIG. 2) to provide coverage to a user equipment device at a larger distance, in accordance with various example embodiments and implementations of the subject disclosure.
Figure 4A:
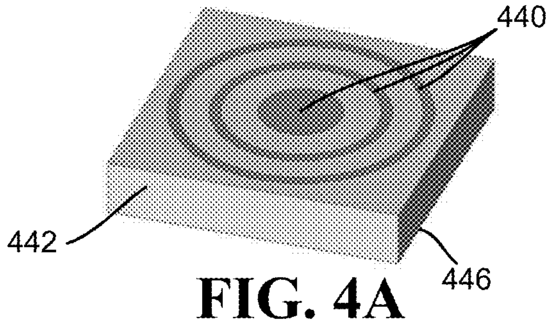
FIGS. 4A-4D are example representations of different air cavity thickness (gaps) separating a substrate of a unit cell from a corresponding portion of the flexible metallic ground plane as the flexible ground plane is curved in different amounts to achieve reconfigurability in the reflected signal, in accordance with various example embodiments and implementations of the subject disclosure.
Figure 4B:
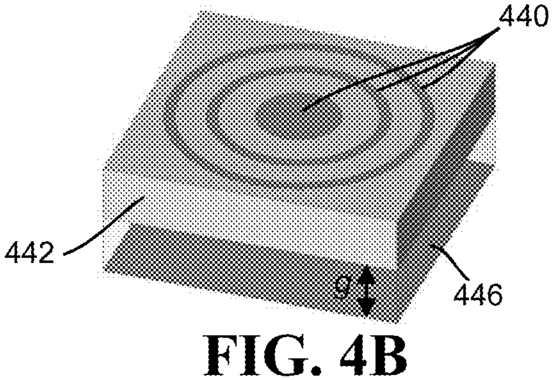
Figure 4C:
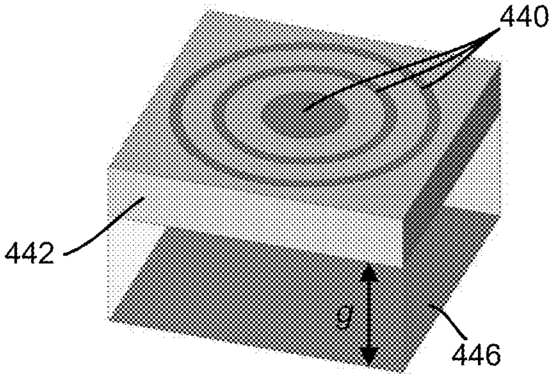
Figure 4D:
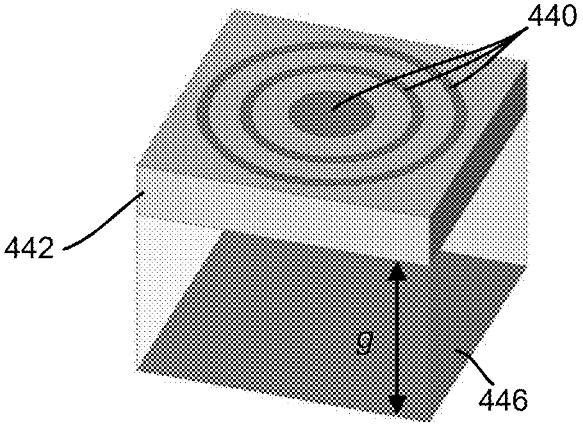

FIGS. 2 and 3 are examples of typical use-case scenarios based on controlled variable beam shaping as described herein. As shown in FIG. 2, in one direction a signal from a base station 220 to nearby user equipment (UEs) 222 is blocked by an obstacle 224. At the same time, an incident signal from the base station 220 reaches a metasurface panel 226 as described herein, which has a phase profile that reflects a broader (relative to FIG. 3) beam 228 to the nearby UEs 222.

As described herein, the reflected beam is shaped based on the unit cells of the metasurface panel 226; one such unit cell shown in FIG. 2 as the enlarged unit cell 230. Note that one example metallic resonating pattern of the unit cell 230 is depicted in the form of a concentric ring-shaped metallic pattern, with that pattern resonating at a frequency that corresponds to the frequency of the incoming signal. Notwithstanding, a unit cell can have a resonating pattern of any suitable shape (e.g., square, rectangular and so on) that resonates at or near a corresponding frequency of the incoming signal, and is not limited to concentric ring patterns.

In contrast to the scenario depicted in FIG. 2, as shown in FIG. 3, in the same direction the signal from the base station 220 to a more distant user equipment (UEs) 322 is also blocked by the obstacle 224. In this alternative example scenario, the incident signal from the base station 220 similarly reaches the metasurface panel 226, which has a phase profile that reflects a narrower (relative to FIG. 2) and higher gain beam 328 to the more distant UE 322. Thus, the metasurface panel 226 as described herein can provide coverage to nearby UE(s) via a broader reflected beam, or to more distant UE(s) with a beam that is tuned more narrowly (and hence has higher gain). As described herein, the beam shape can be tweaked between broad and narrow based on the curvature of the ground plane of the metasurface.

In general, the reflective metasurface 226 of FIG. 2 (and FIG. 3) is formed by a two-dimensional periodic array of unit cells. The unit-cell structure is shown in FIGS. 4A-4D. In this depicted example embodiment, metallic concentric circular loops 440 are printed on a substrate 442, e.g., a 1.0 mm thick FR4 substrate. The substrate 442 is placed over a ground plane portion 446 (the ground plane's portion/area directly beneath the circular loops 440) forming an air cavity having a variable distance, or gap g as labeled in FIGS. 4B-4D, in which the gap's distance is based on the curvature of the flexible ground plane (which can be different in each ground plane portion below each unit cell) relative to the resonating metallic concentric circular loops 440/the substrate 442. The reflection phase response of the structure is strongly dependent on the cavity thickness, which leads to a significant tuning range for beam shaping. The air cavity thickness gap g separating the substrate, and the flexible metallic bottom sheet (ground plane) is movable, based on curving the flexible ground plane to achieve the reconfigurability in the reflected signal.

Figure 5:
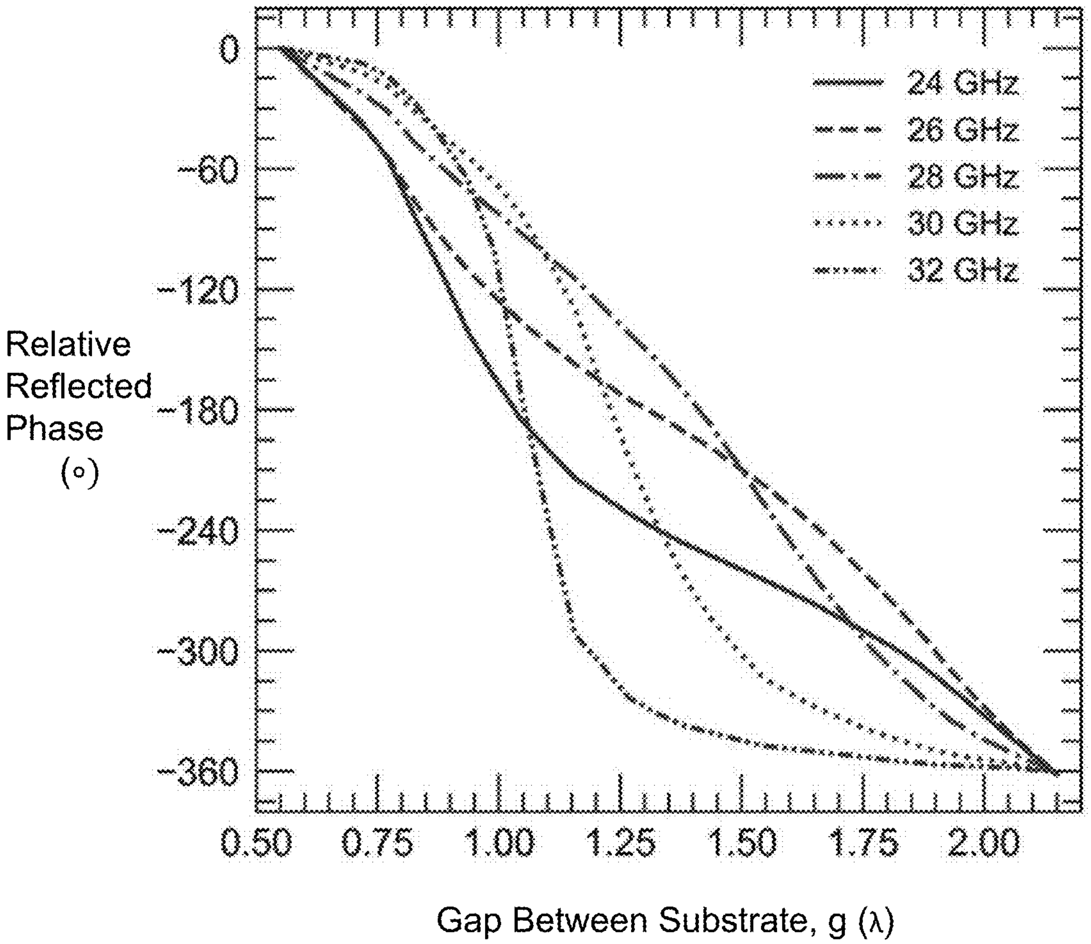
FIG. 5 is an example graph showing a simulation of relative reflected phases at different millimeter wave (mmWave) operational frequencies with flexible metallic ground plane changes in gap distances between a substrate and the flexible metallic ground plane, in accordance with various example embodiments and implementations of the subject disclosure.

FIG. 5 graphically shows example results obtained from a simulation with different frequencies at different gap distances. As can be seen, the simulated relative reflected phase (in degrees) of relative reflected phase at different mm Wave operational frequencies (for a given wavelength (2) depends on the amount of gap, which is changeable as described herein, between the substrate and the metallic sheet/ground plane. FIG. 5 highlights how the surface can operate over a large bandwidth of 24-32 GHz with phase change achieved by changing the gap between the substrate and the movable metallic sheet.

Figure 6:
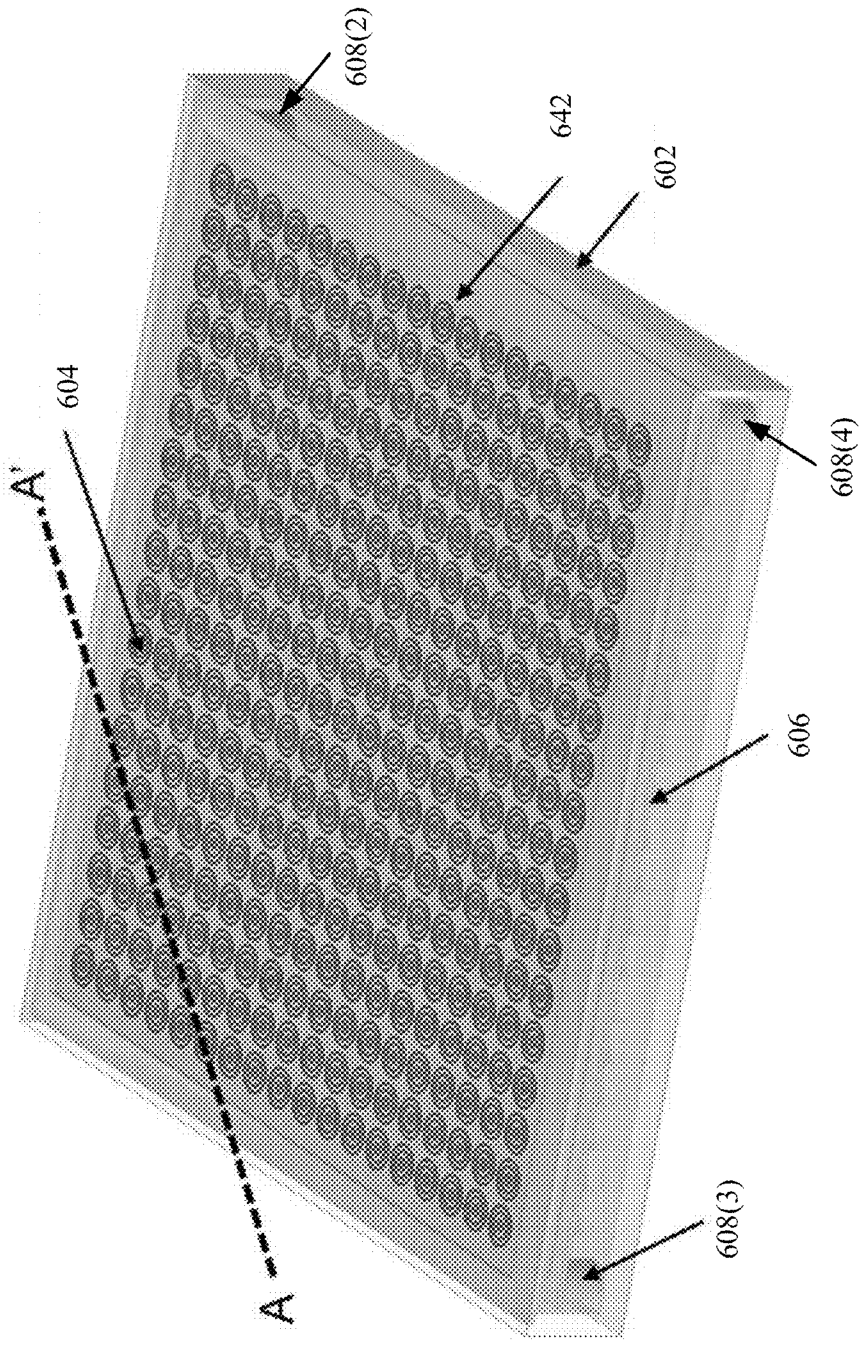
FIG. 6 is an isometric full section view of an example reconfigurable surface including components within a housing, in accordance with various example embodiments and implementations of the subject disclosure.
Figure 7:
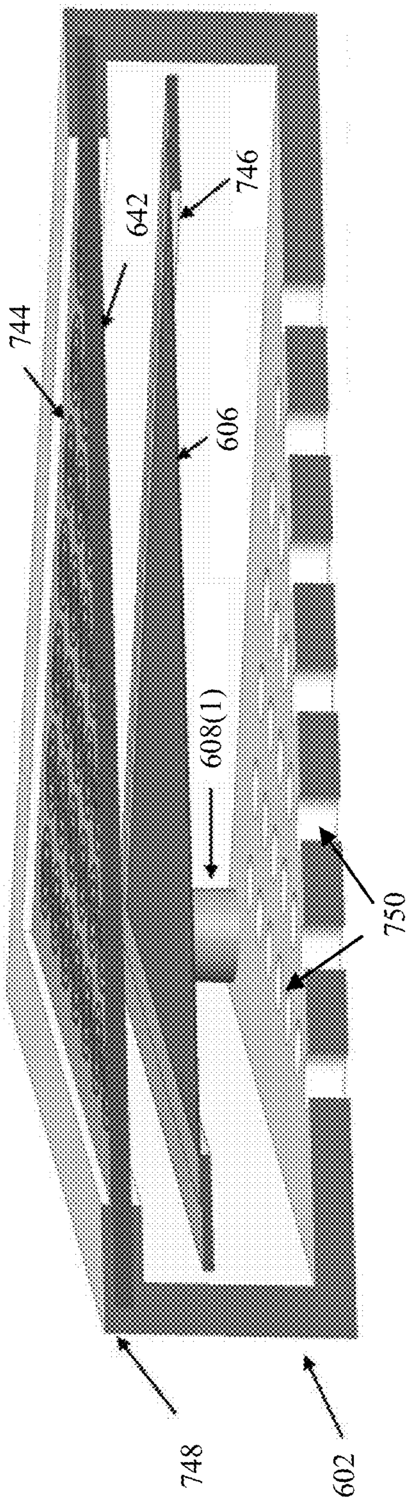
FIG. 7 is a sectional view (based on the cut-plane A-A' of FIG. 6) of the example reconfigurable surface including components within a housing, in accordance with various example embodiments and implementations of the subject disclosure.
Figure 8:
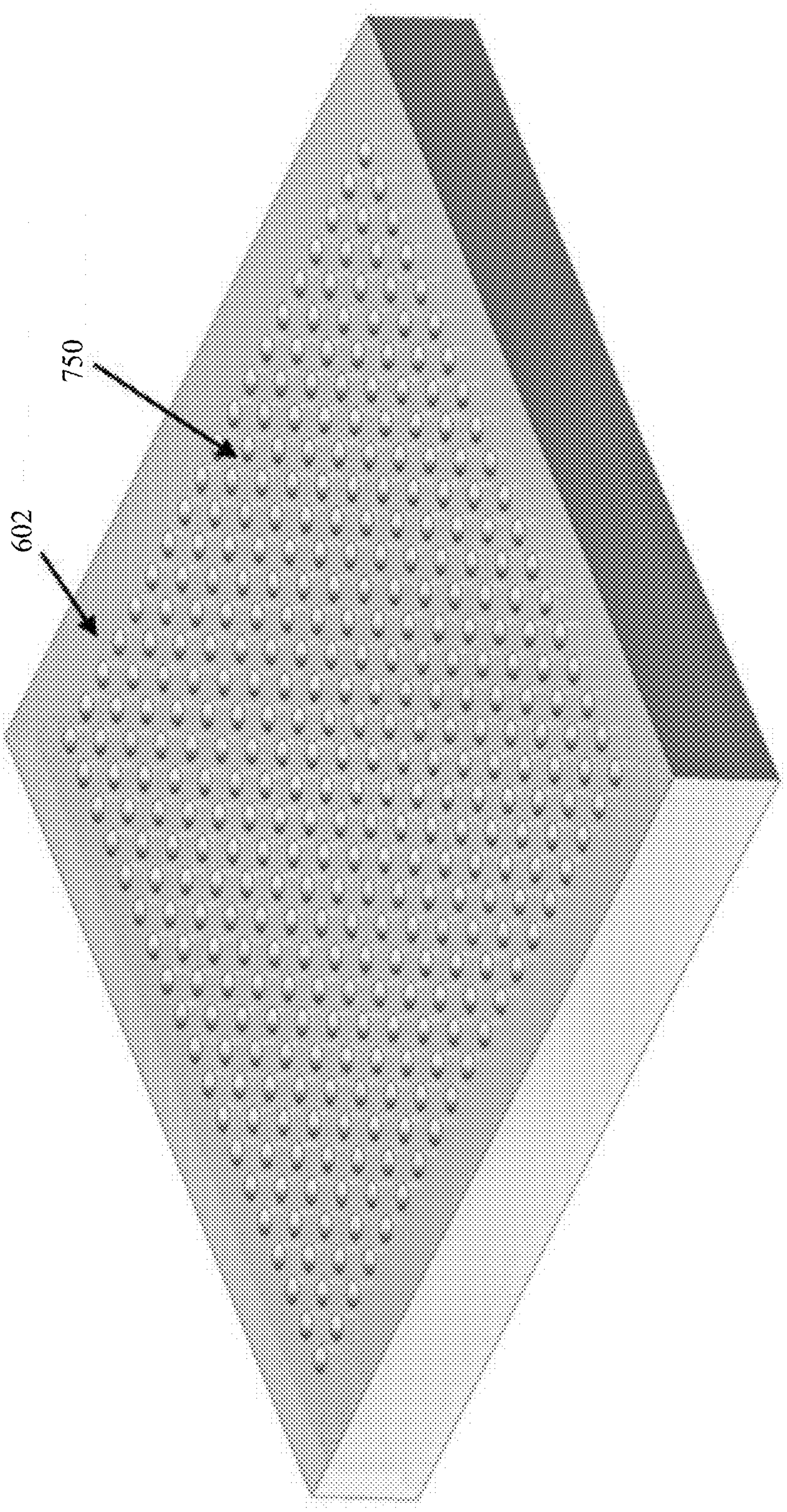
FIG. 8 is a back side view of the example reconfigurable surface housing showing perforations to reduce air damping, in accordance with various example embodiments and implementations of the subject disclosure.

The beam shaping functionality can be incorporated into a complete product, such as shown in FIGS. 6-8. More particularly, FIG. 6 shows a 3D isometric view of a panel with housing 602 and other components, including one labeled metallic element 604 of the multiple (e.g., 18×18 in this example) unit cells on a substrate 642. The flexible metal plane 606 is curved by the actuators, one in each corner, including at least part of the visible actuators 608(2)-608(4). A cut plane (A-A') is highlighted in FIG. 6, to show the interior of the structure in FIG. 7.

In FIG. 7, the sectional view (corresponding to the cut plane A-A' of FIG. 6) of the housing 602 is shown with unit cells (collectively 744) above the substrate 642. One type of anchor is a support anchor 746 that supports one of the four corners of the moveable (flexible) ground plane 606; the other three anchors are not labeled in this view. Other anchors, including the unit cell substrate anchor labeled 748, support the unit cells 744 including the substrate 642. FIG. 7 also shows perforations (collectively 750), which help to avoid any air damping, facilitate heat dissipation, and result in weight reduction of the panel. The reverse side of the panel is shown in FIG. 8, which highlights these perforations 750 in the underside of the housing 602.

Figure 9:
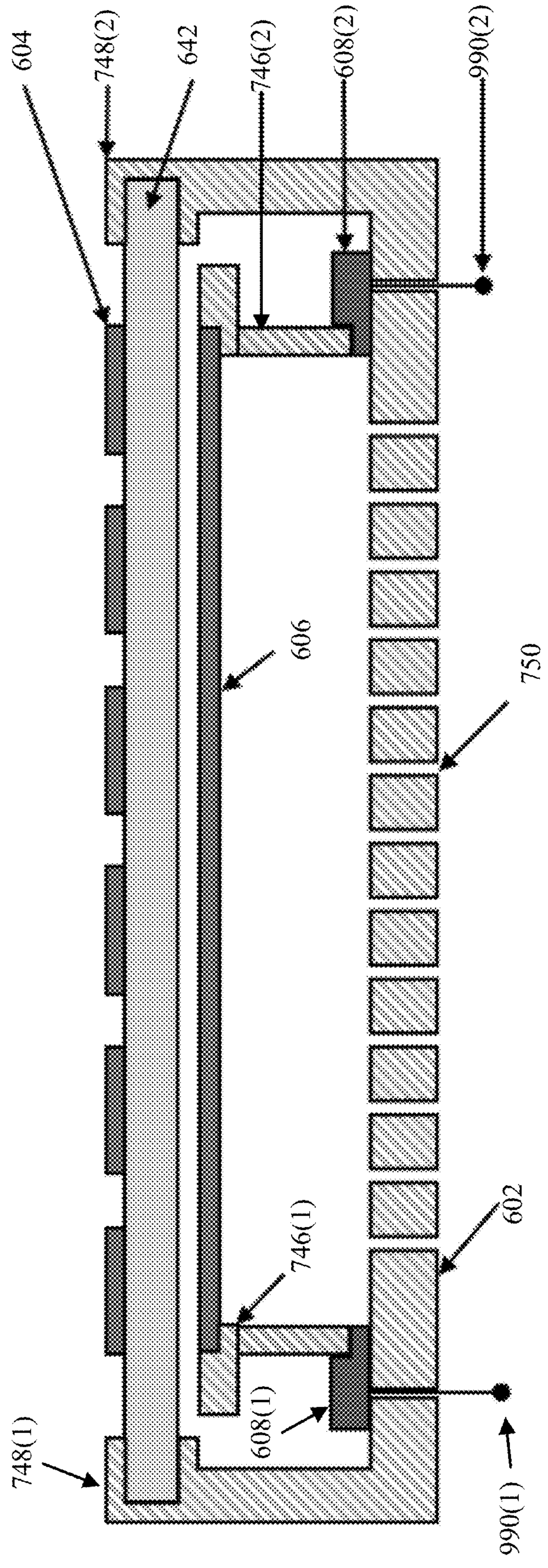
FIG. 9 is a cross-sectional view of the example reconfigurable surface, including a tuning mechanism and parts of the reflective metasurface, in accordance with various example embodiments and implementations of the subject disclosure.

Additional details of the panel are shown in the cross-sectional 2D projection or front view representation in FIG. 9, highlighting various parts and the tuning mechanism. The labeled parts in FIG. 9 include the housing 602, the metallic elements 604, the flexible ground plane sheet 606, the substrate 642 and the perforations 750. Two of the four flexible ground plane sheet support anchors 746(1) and 746(2) are shown, as are two of the four unit cell substrate supports 748(1) and 748(2). FIG. 9 also highlights how two of the four linear actuators 608(1) and 608(2) are controllable via control terminals 990(1) and 990(2) for driving the motors thereof via a controller or the like.

The housing 602 and support structure or anchors 748(1) and 748(2) can be made using various materials, such as TEFLON, ABS, PET, PET-G and/or any other commonly available RF transparent material. The thickness of the flexible sheet 606 needs to be thick enough to not allow mechanical breakage or failure, yet thin enough to accommodate the force of the linear motors 608(1)-608(2). A slightly thicker sheet can be used as the panel size increases, to avoid creating a negative budge in the center due to gravity. A simple support structure (not explicitly shown) can be used in the middle of the sheet 608 to mitigate this concern without increasing any complexity in the design.

Figure 10:
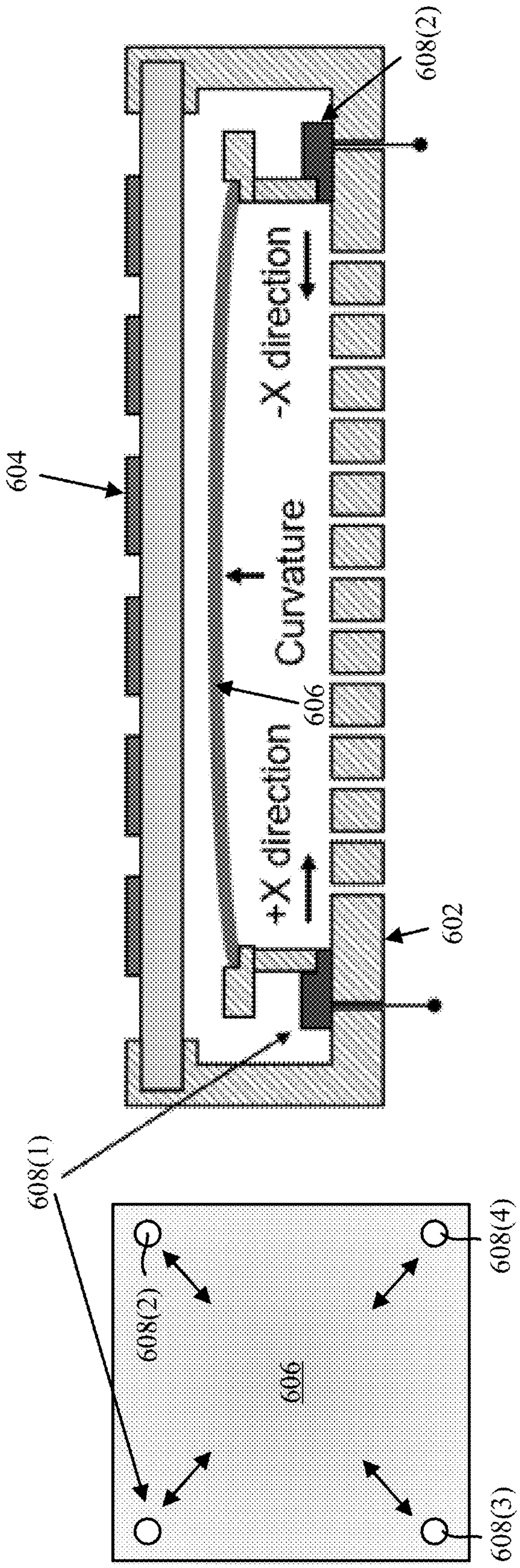
FIG. 10 is a cross-sectional view of the example reconfigurable surface showing how actuating linear actuators create one curvature in the ground plane that can be tuned in analog style, in accordance with various example embodiments and implementations of the subject disclosure.
Figure 11:
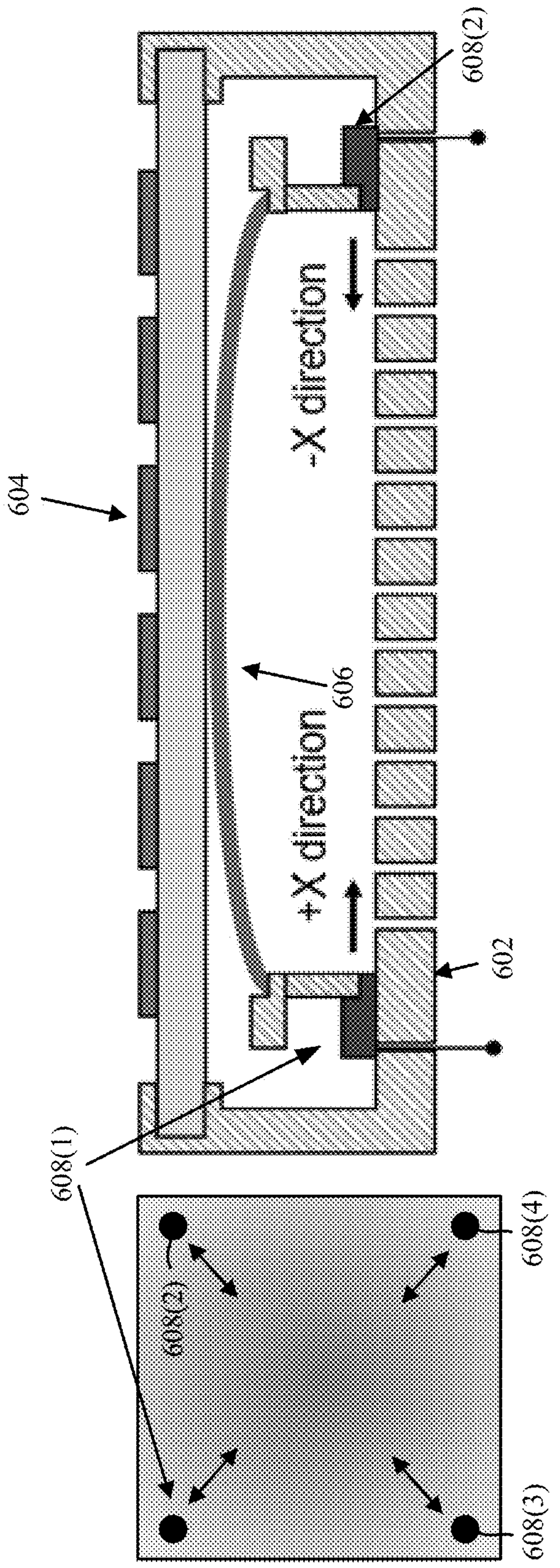
FIG. 11 is a cross-sectional view of the example reconfigurable surface showing how actuating linear actuators create a different curvature (relative to FIG. 10) in the ground plane that can be tuned in analog style, in accordance with various example embodiments and implementations of the subject disclosure.

FIGS. 10 and 11 show example representations of how the flexible metal sheet ground plane 606 can be curved to achieve different phase profiles. The linear actuators 608(1)-608(4) when actuated towards each other push the movable metal sheet 606 towards the inside of the housing 602, creating a curvature in the middle of the ground plane 606. How much curvature is dependent on how far the actuators are extended, as highlighted in FIG. 10 (less curvature) versus FIG. 11 (more curvature). The amount of curvature dictates the beam width or beam shape as depicted in FIG. 11. The lighter-shaded dots representing the linear actuators 608(1)-608(4) in FIG. 10 represent less linear displacement (corresponding to low bias) from the actuator extension, while the darker-shaded dots representing the linear actuators 608(1)-608(4) in FIG. 11 represent relatively more linear displacement/actuator extension (corresponding to higher or full bias). As can be seen, in both FIGS. 10 and 11, the gaps between the distinct metallic elements of the unit cells and the distinct portions of the ground plane beneath each metallic element vary with the amount of curvature.

In one example implementation, commercially available linear motion actuators, such as such as Ladex part number 195200-237, can provide up to one-half inch of linear motion. Other, similar linear actuators can be used for larger motion displacement. In this example implementation, the actuators are placed at 45-degree angles in each corner to provide linear motion or force towards the interior of the cavity/housing as generally represented in FIGS. 10 and 11.

It should be noted that straightforward beam shaping can be accomplished by driving the motors the same amount in each direction. However, this is not a limitation, and different amounts of driving and/or different driving angles can achieve more complex phase profiles. Further, note that while feasible to use less than four actuators to achieve different phase profiles, e.g., one that pushes up the center, or two actuators (or three) that push two (or three) moveable corners of the ground plane towards two (or one) fixed corner(s) of the ground plane, it has been found that for many applications too sharp of a gradient results from doing so, and thus for many applications four actuators provide desirable results.

Figure 12:
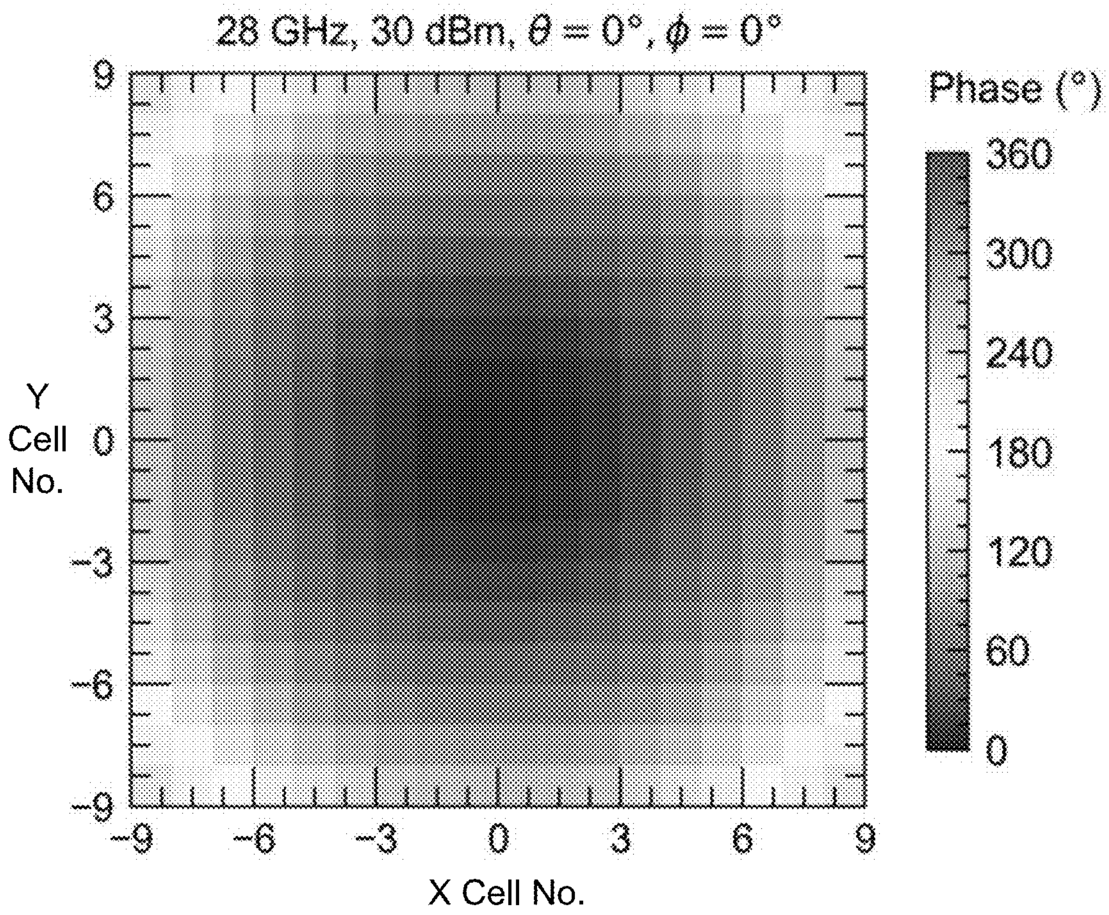
FIG. 12 is an example simulated phase profile of an 18×18 unit-cell reconfigurable surface panel that demonstrates beam shape change with a change of ground plane curvature, in accordance with various example embodiments and implementations of the subject disclosure.
Figure 13:
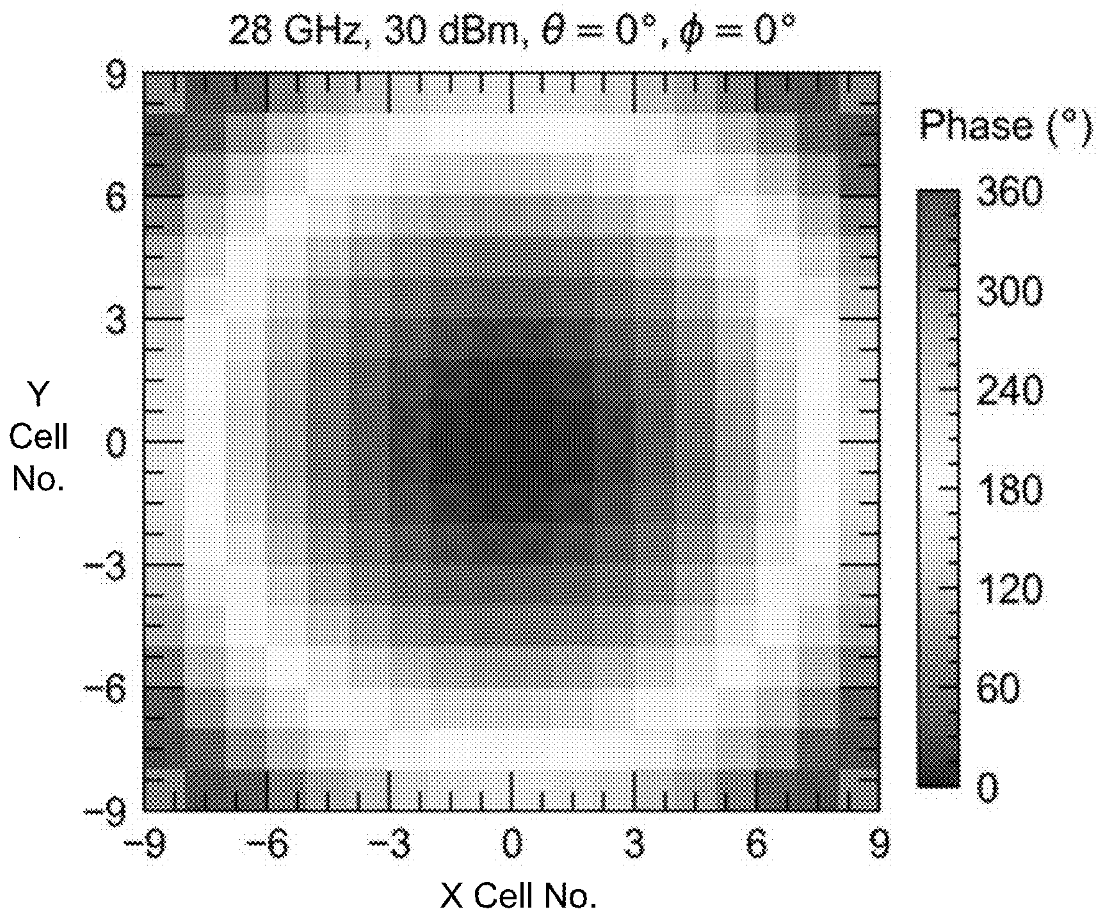
FIG. 13 is an example simulated phase profile of an 18×18 unit-cell reconfigurable surface panel that demonstrates beam shape change with a different change of ground plane curvature (relative to FIG. 12), in accordance with various example embodiments and implementations of the subject disclosure.
Figure 14:
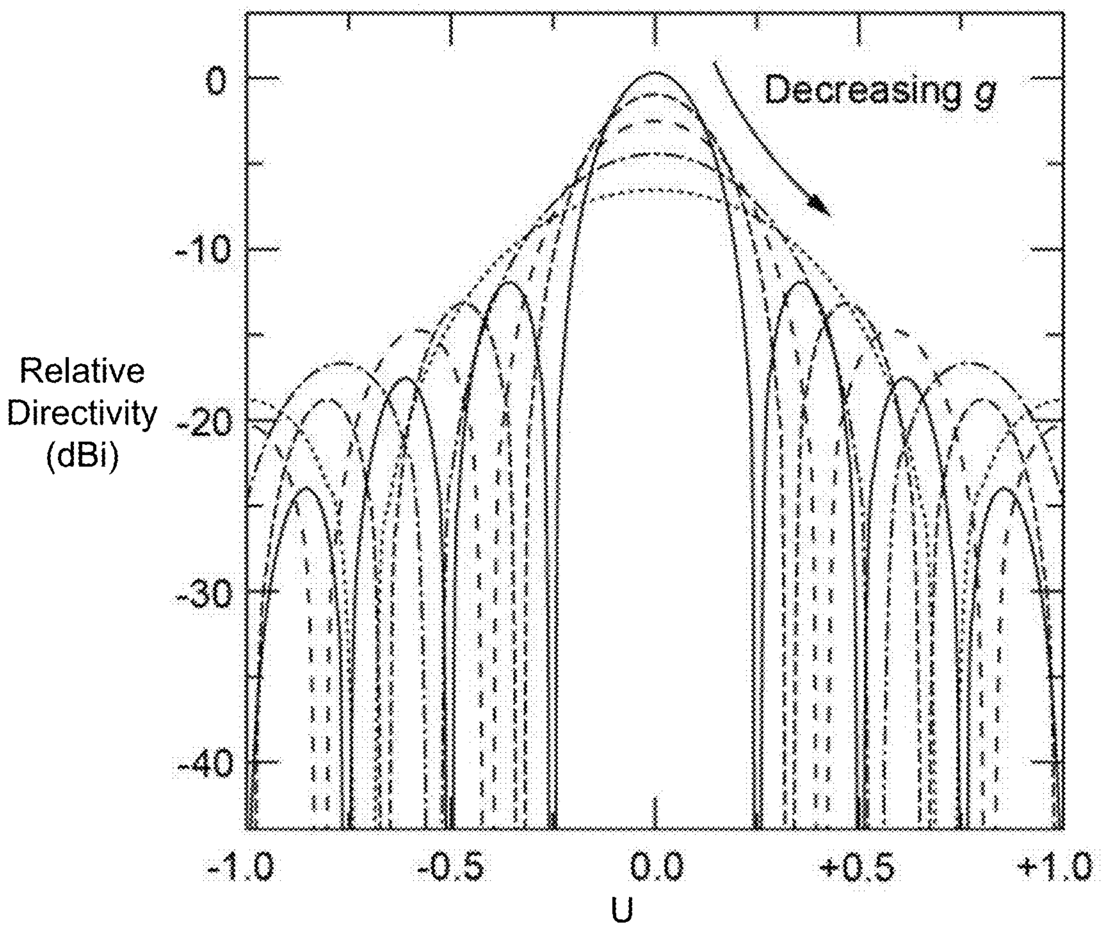
FIG. 14 is an example graph showing a simulation of relative directivity response of a 64-cell metasurface showing how the beam shape can be adjusted based on varying (including decreasing) gap distances, in accordance with various example embodiments and implementations of the subject disclosure.
Figure 15:
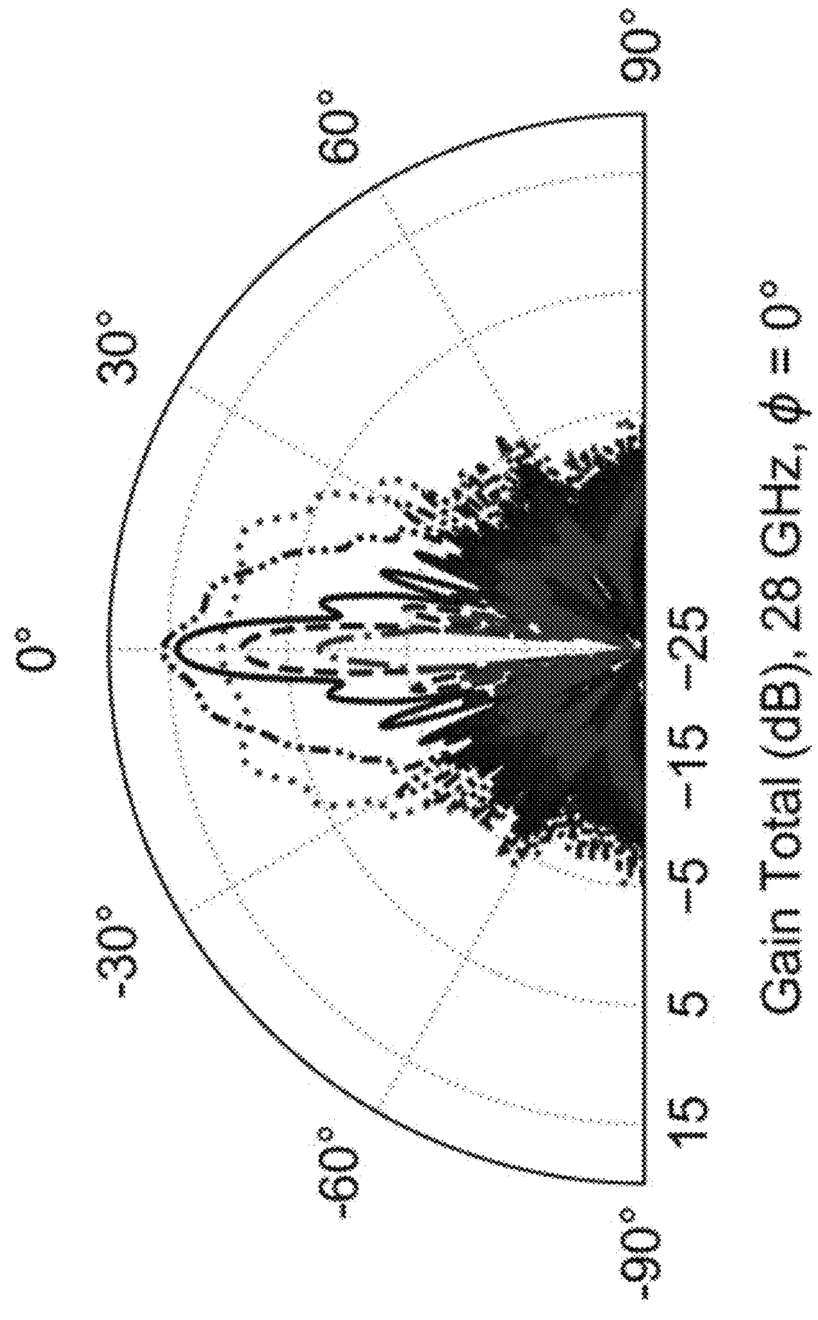
FIG. 15 is an example graph showing gain for different ground plane curvature positions, in accordance with various example embodiments and implementations of the subject disclosure.

FIGS. 12 and 13 are example representations of a simulated (e.g., using Ansys HFSS) phase profile of an 18×18 unit-cell panel that demonstrate different beam shape changes with a change of curvature. The simulation proof can be further proven using Ansys HFSS. More particularly, an 8×8 panel was designed and analyzed as shown in FIG. 14, resulting in beam shape change with change in the gap between substrate and the movable metal sheet. The simulated relative directivity response of the 64-cell metasurface shows that with decreasing gap, (normalized from −1.0 to +1.0), the beam shape can be tweaked, and vice-versa for increasing gap. FIG. 15 shows beam shaping on a semi-polar plot for the panel, that is, the gain (in dB) for different metal sheet positions based on amount of curvature.

One or more example embodiments can be embodied in a reconfigurable surface, such as described and represented herein. The reconfigurable surface can include respective metallic resonating elements of respective unit cells located at an upper portion of the reconfigurable surface to reflect an electromagnetic signal impinging on the reconfigurable surface as a reflected beam, and a flexible metallic ground plane beneath the respective metallic resonating elements forming respective gaps between respective areas of the flexible ground plane and the respective metallic resonating elements. The reconfigurable surface can further include a group of linear actuators controllable to curve the flexible ground plane to change respective distances corresponding to the respective gaps between the respective areas of the flexible ground plane and the respective resonating metallic elements, wherein the respective distances determine a phase profile of the reconfigurable surface that is usable to determine a shape of the reflected beam.

The group of linear actuators can be electrically coupled to a controller to drive the group of linear actuators to controllably curve the flexible ground plane. The respective distances can be first respective distances, the phase profile can be a first phase profile that determines a first shape of the reflected beam, and the controller can drive the group of linear actuators to controllably curve the flexible ground plane to change the respective distances from the first respective distances to second respective distances that determine a second phase profile of the reconfigurable surface that determines a second shape of the reflected beam.

The flexible ground plane can include four respective corners, and the group of linear actuators can include four respective linear actuators mechanically coupled to the four respective corners. The four respective linear actuators can be mechanically coupled to the four respective corners via four respective support anchors. The four respective linear actuators can be configured to curve the flexible ground plane by driving the four respective corners towards a center of the reconfigurable surface.

Further embodiments can include a housing that contains the respective metallic resonating elements, the flexible metallic ground plane and the group of linear actuators. The housing can include perforations at a lower portion of the housing opposite the upper portion of the reconfigurable surface.

The group of linear actuators can include respective linear actuators that can be respectively angled relative to the flexible ground plane with respect to respective driving directions of the respective linear actuators. The respective driving directions of the respective linear actuators can be towards the center of the reconfigurable surface, and away from the center of the reconfigurable surface.

The respective metallic resonating elements can be arranged as a two-dimensional array at the upper portion of the reconfigurable surface, and the respective metallic resonating elements can be configured to resonate at a frequency corresponding to a frequency of the electromagnetic signal impinging on the reconfigurable surface.

Figure 16:
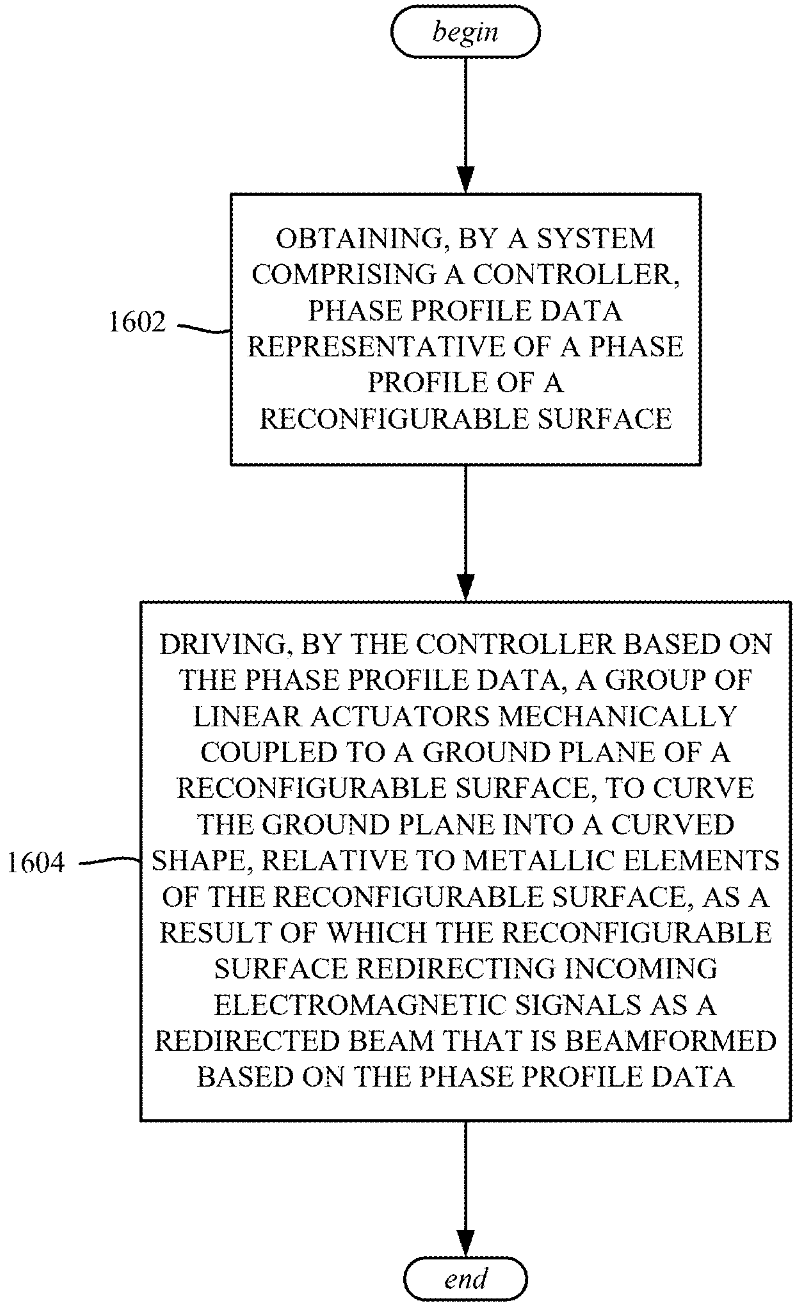
FIG. 16 is a flow diagram showing example operations related to driving a group of linear actuators to curve a ground plane based on phase profile data, in accordance with various example embodiments and implementations of the subject disclosure.

One or more example embodiments, such as corresponding to example operations of a method, are represented in FIG. 16. Example operation 1602 represents obtaining, by a system comprising a controller, phase profile data representative of a phase profile of a reconfigurable surface. Example operation 1604 represents driving, by the controller based on the phase profile data, a group of linear actuators mechanically coupled to a ground plane of a reconfigurable surface, to curve the ground plane into a curved shape, relative to metallic elements of the reconfigurable surface, as a result of which the reconfigurable surface redirecting incoming electromagnetic signals as a redirected beam that is beamformed based on the phase profile data.

The ground plane can include four respective corners, the group of linear actuators can include four respective linear actuators mechanically coupled to the four respective corners, and driving by the controller of the group of linear actuators can include driving the four respective corners towards a center of the reconfigurable surface to curve the ground plane into the curved shape.

The phase profile data can be first phase profile data, the redirected beam can be a first redirected beam, and the curved shape can be a first curved shape; further operations can include obtaining, by the system, second phase profile data representative of a second phase profile of the reconfigurable surface, and driving, by the controller based on the second phase profile data, the group of linear actuators to curve the ground plane into a second curved shape that results in the reconfigurable surface redirecting the incoming electromagnetic signals as a second redirected beam that is beamformed based on the redirected phase profile data Driving the group of linear actuators to curve the ground plane can change an average gap between the metallic elements and the ground plane to narrow the second redirected beam relative to the first redirected beam.

Driving the group of linear actuators to curve the ground plane changes an average gap between the metallic elements and the ground plane to widen the second redirected beam relative to the first redirected beam.

One or more example embodiments can be embodied in a system, such as described and represented herein. The system can include respective metallic resonating elements of respective unit cells located at an upper portion of a reconfigurable surface, a flexible metallic ground plane adjacent to the respective metallic resonating elements that forms respective gaps between respective portions of the flexible ground plane and the respective metallic resonating elements, and a controller that mechanically curves the flexible metallic ground plane to determine respective distances between the respective portions of the flexible ground plane and the respective resonating metallic elements; the respective distances can determine a shape of a beamformed beam reflected by the reconfigurable surface from an electromagnetic signal impinging on the reconfigurable surface.

Further embodiments can include at least one mechanical actuator mechanically coupled to the flexible metallic ground plane; the controller can mechanically curve the flexible metallic ground plane by driving the at least one mechanical actuator mechanically coupled to the flexible metallic ground plane.

The flexible metallic ground plane can include four respective corners, and further embodiments can include four respective mechanical actuators mechanically coupled to the four respective corners; the controller can mechanically curve the flexible metallic ground plane by driving the four respective mechanicals actuators. The four respective mechanicals actuators can be angled relative to the four respective corners to drive the four respective corners towards one another.

As can be seen, the technology described herein is directed to a beam shaping device based on mechanical tuning, such as with only four linear actuators per panel regardless of panel size or number of unit-cells; (this is in contrast to existing mechanisms that have tunable component soldered on each unit-cell). The technology described herein provides analog-style beam shaping capability with only four set of wires/actuation points per panel instead of quantized states in electronic panels. As such, an expensive FPGA controller or the like is not needed, as the motors can be controlled using a commercial off-the-shelf microcontroller. This further facilitates low to minimum coding that need only control four actuators, further driving down the software development and debugging costs.

Benefits thus include beam reconfigurability with reduced cost of manufacturing by utilizing a flexible metal sheet to create a curvature using linear actuators. Low-cost fabrication along with no vendor-specific component requirements help reduce the cost. Indeed, among other benefits, the reconfigurability device described herein offers more than a 95% cost reduction when compared to currently available electronic beam manipulation solutions. For example, scaling up other solutions increases exponentially with cost as the number of unit cells increases exponentially, e.g., an 8×8 unit cell device needs components (PIN diodes and/or varactors) and soldering for 64 unit cells, a 16×16 unit cell device needs components and soldering for 256 unit cells, a 32×32 unit cell device needs components and soldering for 1024 unit cells, and so on. For example, a 64×64 unit cell device with PIN diodes and/or varactors can cost over $10,000 to construct. If a unit-cell requires more than one PIN diode for more tuning states, the cost further exponentially rises. In contrast, the technology described herein operates with four low cost linear actuators regardless of the number of unit cells, whereby a 64×64 unit cell device based on linear actuators as described herein generally costs less than $600.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A reconfigurable surface, comprising:

a substrate;

metallic resonating elements placed on the substrate, wherein respective metallic resonating elements of respective unit cells are located at an upper portion of the reconfigurable surface to reflect an electromagnetic signal impinging on the reconfigurable surface as a reflected beam;

a flexible metallic ground plane beneath the respective metallic resonating elements forming respective gaps between respective areas of the flexible metallic ground plane and the respective metallic resonating elements; and a group of linear actuators controllable to curve the flexible metallic ground plane to change respective distances corresponding to the respective gaps between the respective areas of the flexible metallic ground plane and the respective resonating metallic elements, wherein the respective distances determine a phase profile of the reconfigurable surface that is usable to determine a shape of the reflected beam, wherein the group of linear actuators comprises respective linear actuators that are respectively angled relative to the flexible metallic ground plane with respect to respective driving directions of the respective linear actuators, and wherein the respective driving directions of the respective linear actuators are towards a center of the reconfigurable surface and away from the center of the reconfigurable surface.

2. The reconfigurable surface of claim 1, wherein the group of linear actuators is electrically coupled to a controller to drive the group of linear actuators to controllably curve the flexible metallic ground plane.

3. The reconfigurable surface of claim 2, wherein the respective distances are first respective distances, wherein the phase profile is a first phase profile that determines a first shape of the reflected beam, and wherein the controller drives the group of linear actuators to controllably curve the flexible metallic ground plane to change the respective distances from the first respective distances to second respective distances that determine a second phase profile of the reconfigurable surface that determines a second shape of the reflected beam.

4. The reconfigurable surface of claim 1, wherein the flexible metallic ground plane comprises four respective corners, and wherein the group of linear actuators comprises four respective linear actuators mechanically coupled to the four respective corners.

5. The reconfigurable surface of claim 4, wherein the four respective linear actuators are mechanically coupled to the four respective corners via four respective support anchors.

6. The reconfigurable surface of claim 4, wherein the four respective linear actuators are configured to curve the flexible metallic ground plane by driving the four respective corners towards the center of the reconfigurable surface.

7. The reconfigurable surface of claim 1, further comprising a housing that contains the respective metallic resonating elements, the flexible metallic ground plane and the group of linear actuators.

8. The reconfigurable surface of claim 7, wherein the housing comprises perforations at a lower portion of the housing opposite the upper portion of the reconfigurable surface.

9. The reconfigurable surface of claim 1, wherein the respective metallic resonating elements are arranged as a two-dimensional array at the upper portion of the reconfigurable surface, and wherein the respective metallic resonating elements are configured to resonate at a frequency corresponding to a frequency of the electromagnetic signal impinging on the reconfigurable surface.

10. A method, comprising:

obtaining, by a system comprising a controller, phase profile data representative of a phase profile of a reconfigurable surface; and driving, by the controller based on the phase profile data, a group of linear actuators mechanically coupled to a ground plane of the reconfigurable surface, to curve the ground plane into a curved shape, relative to metallic elements of the reconfigurable surface, as a result of which the reconfigurable surface redirecting incoming electromagnetic signals as a redirected beam that is beamformed based on the phase profile data, wherein the ground plane comprises four respective corners, wherein the group of linear actuators comprises four respective linear actuators mechanically coupled to the four respective corners, and wherein the driving by the controller of the group of linear actuators comprises driving the four respective corners towards a center of the reconfigurable surface to curve the ground plane into the curved shape.

11. The method of claim 10, wherein the phase profile data is first phase profile data, wherein the redirected beam is a first redirected beam, wherein the curved shape is a first curved shape, and the method further comprising:

obtaining, by the system, second phase profile data representative of a second phase profile of the reconfigurable surface; and driving, by the controller based on the second phase profile data, the group of linear actuators to curve the ground plane into a second curved shape that results in the reconfigurable surface redirecting the incoming electromagnetic signals as a second redirected beam that is beamformed based on redirected phase profile data.

12. The method of claim 11, wherein the driving of the group of linear actuators to curve the ground plane changes an average gap between the metallic elements and the ground plane to narrow the second redirected beam relative to the first redirected beam.

13. The method of claim 11, wherein the driving of the group of linear actuators to curve the ground plane changes an average gap between the metallic elements and the ground plane to widen the second redirected beam relative to the first redirected beam.

14. A system, comprising:

a substrate;

metallic resonating elements placed on the substrate, wherein respective metallic resonating elements of respective unit cells are located at an upper portion of a reconfigurable surface;

a flexible metallic ground plane adjacent to the respective metallic resonating elements that forms respective gaps between respective portions of the flexible metallic ground plane and the respective metallic resonating elements; and a controller that mechanically curves the flexible metallic ground plane to determine respective distances between the respective portions of the flexible metallic ground plane and the respective resonating metallic elements, wherein the respective distances determine a shape of a beamformed beam reflected by the reconfigurable surface from an electromagnetic signal impinging on the reconfigurable surface, wherein the flexible metallic ground plane comprises four respective corners, and further comprising four respective mechanical actuators that are mechanically coupled to the four respective corners, wherein the controller mechanically curves the flexible metallic ground plane by driving the four respective mechanicals actuators, and wherein the four respective mechanicals actuators are angled relative to the four respective corners to drive the four respective corners towards one another.

15. The system of claim 14, further comprising at least one mechanical actuator mechanically coupled to the flexible metallic ground plane, and wherein the controller mechanically curves the flexible metallic ground plane by driving the at least one mechanical actuator mechanically coupled to the flexible metallic ground plane.

16. The system of claim 14, wherein the controller is electrically coupled to at least one memory that retains data indicative of a phase profile.

17. The system of claim 16, wherein the data indicative of the phase profile comprises information indicative of actuator distances for the four respective mechanical actuators, and wherein the actuator distances facilitate curving the flexible metallic ground plane a defined amount that results in a desired phase profile for the beamformed beam.

18. The system of claim 16, wherein the data indicative of the phase profile comprises sets of phase profile data, and wherein, based on a phase profile trigger and the shape of the beamformed beam, the controller selects a phase profile data from the sets of phase profile data.

19. The system of claim 15, wherein the driving the at least one mechanical actuator mechanically coupled to the flexible metallic ground plane by the controller changes an average gap between the respective metallic resonating elements and a ground plane to narrow the shape of the beamformed beam.

20. The system of claim 15, wherein the driving the at least one mechanical actuator mechanically coupled to the flexible metallic ground plane by the controller changes an average gap between the respective metallic resonating elements and a ground plane to widen the shape of the beamformed beam.

* * * * *